United States Patent
Binz et al.

[11] Patent Number: 6,144,911
[45] Date of Patent: Nov. 7, 2000

[54] METHOD FOR PERFORMING GEAR-CHANGE OPERATIONS IN AN AUTOMATED MECHANICAL TRANSMISSION, IN PARTICULAR FOR DIESEL ENGINES

[75] Inventors: Ralf Binz, Sindelfingen; Thomas Brock, Ottobrunn; Ulrich Nester, Stuttgart, all of Germany

[73] Assignee: Daimler Benz Aktiengesellschaft, Stuttgart, Germany

[21] Appl. No.: 09/103,819

[22] Filed: Jun. 24, 1998

[30] Foreign Application Priority Data

Jun. 24, 1997 [DE] Germany ............... 197 26 724

[51] Int. Cl.⁷ .................................................. G06F 7/00
[52] U.S. Cl. .................. 701/51; 701/52; 701/54; 701/56; 701/64
[58] Field of Search ................... 701/51, 52, 53, 701/54, 64, 55, 56; 477/54, 109, 110, 169, 155, 80, 98, 93, 43, 74, 107, 156, 114, 900, 901

[56] References Cited

U.S. PATENT DOCUMENTS

| | | | |
|---|---|---|---|
| 4,493,228 | 1/1985 | Vukovich et al. | 477/109 |
| 4,582,185 | 4/1986 | Grimes et al. | 477/169 |
| 4,807,497 | 2/1989 | Yasu et al. | 477/98 |
| 5,113,721 | 5/1992 | Polly | 477/80 |
| 5,150,635 | 9/1992 | Minowa et al. | 477/43 |
| 5,383,824 | 1/1995 | Runge et al. | 477/110 |
| 5,549,525 | 8/1996 | Wendel | 477/93 |
| 5,603,672 | 2/1997 | Zhang | 477/110 |
| 5,826,208 | 10/1998 | Kuroiwa et al. | 701/54 |
| 5,938,712 | 8/1999 | Ibamoto et al. | 701/54 |
| 6,000,378 | 12/1999 | Minowa et al. | 123/436 |

FOREIGN PATENT DOCUMENTS

| | | |
|---|---|---|
| 0 037 639 | 3/1981 | European Pat. Off. . |
| 0 166 894 | 4/1985 | European Pat. Off. . |
| 4223084 | 7/1992 | Germany . |
| 42 41 171 A1 | 6/1994 | Germany . |
| WO 94/01701 | 1/1994 | WIPO . |
| WO 97/48923 | 12/1997 | WIPO . |

*Primary Examiner*—Jacques H. Louis-Jacques
*Attorney, Agent, or Firm*—Kenyon & Kenyon

[57] ABSTRACT

A method for performing shifting operations in an automated, mechanical transmission, which is coupled via an automated clutch to an internal combustion engine, in particular a diesel engine. The setpoint engine torque (MDsoll) is essentially predefinable by a gas pedal (10) and/or by a vehicle-speed controller or limiter (17, 18). The setpoint engine torque is varied in response to gear shifting operations through the intervention of an electronic control device, as follows: The area of the electronic control device that is designated for the transmission control is continually supplied with the setpoint engine torque MDsoll1. In response to manually or automatically introduced gear shifting operations, a switch is made to the setpoint engine torque being input by the electronic transmission control, which calculates this setpoint engine torque (GW-MD) as a function of gear-change parameters and/or extracts it from gear-change characteristics maps or curves. After completion of the shifting operation, a switch is made, in turn, to the setpoint engine torque (MDsoll1) being input by the gas pedal (10) or the speed controller or limiter (17, 18). An especially smooth and lurch-free shifting can be achieved through the close "cooperation" between transmission control and engine timing, as well as on the basis of the specific feedback information when working with automated, manual transmissions, particularly in conjunction with diesel engines.

15 Claims, 6 Drawing Sheets

METHOD FOR PERFORMING GEAR-CHANGE OPERATIONS IN AN AUTOMATED MECHANICAL TRANSMISSION, IN PARTICULAR FOR DIESEL ENGINES

FIELD OF THE INVENTION

The present invention relates to a method for performing gear-change operations in an automated mechanical transmission, which is coupled via an automated clutch to an internal combustion engine, in particular a diesel engine.

RELATED TECHNOLOGY

Automatic gears having hydraulic torque converters have been known for quite some time, for example from German Patent Application No. 40 37 092 A1, German Patent Application No. 42 41 171 A1 or PCT Application No. WO 94/01701. They facilitate and simplify the driving of motor vehicles, making it easier, particularly under conditions of heavy traffic, for a driver to concentrate on traffic without being distracted. In recent years, such automatic gear shifting has become smoother and smoother, so that a very smooth standard is already in existence today, which enables a start and shifting that are virtually free of lurches. These automatic transmissions however have the disadvantage of being relatively large, heavy, and expensive, which makes it difficult for them to be installed, above all, in compact vehicles.

To overcome these disadvantages, automated transmissions have already been developed for small vehicles, these transmissions being essentially conventional, manual transmissions, but with automated shifting operations. In a comparable manner, the classic, foot-actuated clutch has been replaced by an automated clutch. Automated manual transmissions of this kind are known, for example, from German Patent Application No. 36 27 718 A1 or European Patent Application No. A-0 633 155.

In comparison to automatic transmissions, mechanical or manual transmissions, which do not require hydraulic torque converters, can be manufactured with a lighter and smaller-volume type of construction, and at a lower cost. The desired characteristics of such automated manual transmissions, such as very smooth and lurch-free shifting, are similar to those of automatic transmissions, but they are more difficult to meet. It is known from the related art cited above to reduce the engine torque at the time of the shifting operation. However, this realization, which is based on general principles, usually does not suffice to achieve a high level of smooth shifting, because such smooth shifting requires a close "cooperation" between engine timing and transmission control.

SUMMARY OF THE INVENTION

An object of the present invention is to devise a method for smoothly shifting an automated manual transmission. This method may be accompanied by an improved interaction between transmission control and engine timing, and which is suited, in particular, for diesel engines.

The present invention therefore provides the following method steps:

The area of the electronic control device that is designated for the transmission control is continually supplied with a setpoint engine torque;

in response to manually or automatically introduced gear shifting operations, a switch is made to the setpoint engine torque input by the electronic transmission control, which calculates this setpoint engine torque as a function of shifting parameters and/or extracts it from shifting characteristic maps or curves; and after completion of the shifting operation, a switch is made, in turn, to the setpoint engine torque being input by the gas pedal or the speed controller or limiter.

With the method according to the present invention, an interface is implemented between the area in the electronic control device that is responsible for engine timing and the area in the electronic control device that is responsible for transmission control, and the interface is accommodated in a single shared control unit. This enables shifting operations to be optimized by the cooperation between engine timing and transmission control in a way that will make it possible for smoother and lurch-free shifting to be achieved. The cooperation is accomplished, in particular, by mutual feedback.

During gear shift operations, control actions that are in sequential phase order are initiated by the transmission control for the setpoint engine torque, the setpoint engine torque being advantageously input during a gear-change operation in the form of an engine torque desired for a gear shift and/or an engine speed desired for a gear shift, so that in this manner the transmission control intervenes automatically in the engine timing.

Improved and optimized shifting operations are achieved, in particular, in that during a gear shift operation, there first is a controlled engine-torque reduction in a downward-control phase, the speed is then controlled to a predefined value in a speed-control phase, and there is then a controlled engine-torque increase in an upward control phase. In the process, the transmission control preferably uses setpoint-value ramps to predefine the engine torque in the downward control phases and upward control phases, the end of the ramp function and the transition to the driver-controlled operation being a function of the driver's momentary requirements.

At the beginning, and during the transitions between the phases, switch-over operations are performed to switch over to the setpoint-selection function allocated to the particular intended phase, the switch-over operations being advantageously performed by series-connected changeover switches. Thus, by actuating the changeover switch in question, the transition can be made to the particular intended setpoint-selection function, which then specifies the setpoint engine torque that is effective at the moment.

The area of the electronic transmission control that is responsible for the gear-change control is advantageously fed the setpoint engine torque, both as a limited driver-input torque, and as the setpoint engine torque actually predefined to the engine timing. From this feedback, the transmission control learns which function is actively switched at the moment.

Following each switch-over operation, a status message is output to this effect, and can be accessed by all areas of the electronic control device.

The setpoint engine torque is fed to the engine timing in the form of a fuel quantity to be supplied to the internal combustion engine, and from this fuel quantity, the relevant torque values are derived for the feedback to the transmission control.

To avoid overload, the setpoint engine torque predefined at any one time as a desired input by the transmission control is effectively limited as a function of the various shifting operations, and as a function of gear protection requirements.

BRIEF DESCRIPTION OF THE DRAWINGS

Exemplary embodiments of the method according to the present invention are depicted in the drawing and elucidated in the following description, in which.

DETAILED DESCRIPTION

Figure 1:
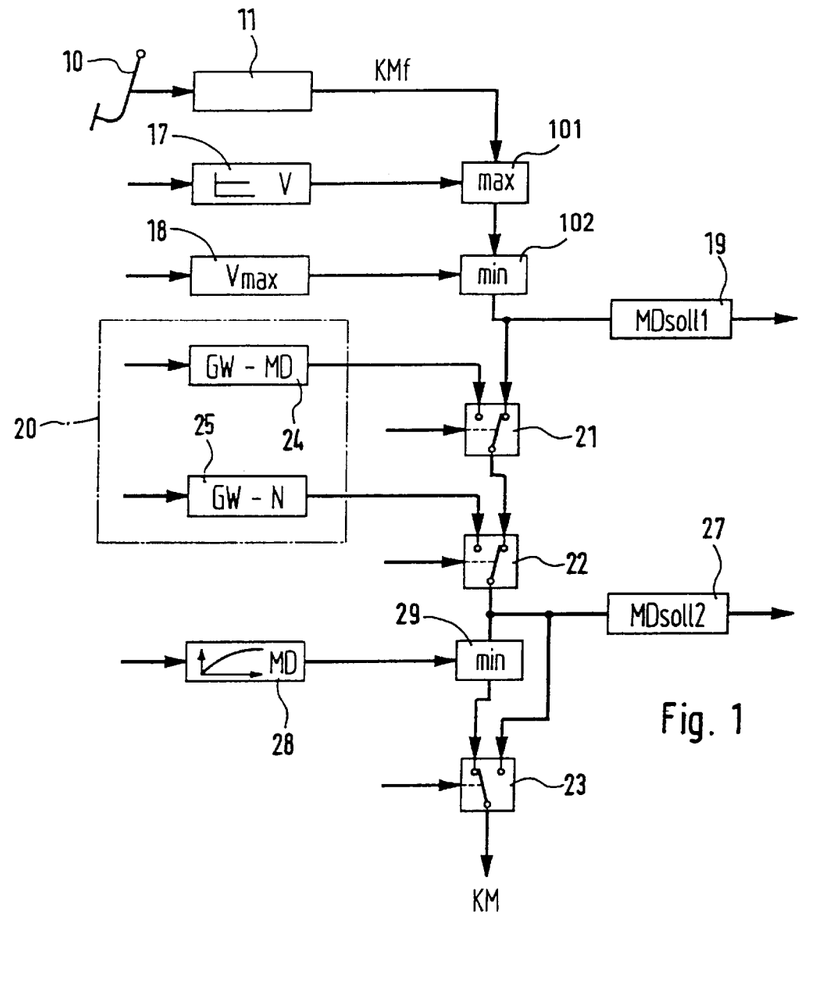
FIG. 1 shows a schematic general view of functional sequences controlled, in principle, during one gear shifting operation.
Figure 2:
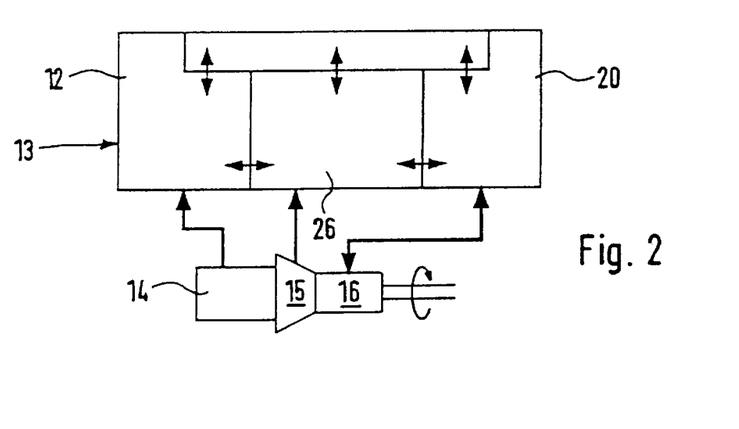
FIG. 2 shows a schematic view of an electronic control device for controlling a diesel engine, an automated clutch, and an automated manual transmission.

As shown in FIGS. 1 and 2, the driver of a motor vehicle selects the engine torque (MD) he or she desires via a gas pedal 10. From the angular position of gas pedal 10, the proper fuel quantity (KMf) for the internal combustion engine is preset in a driver-selection input device 11, the signal to this effect being fed to an electronic engine timing 12, which constitutes an area of an electronic control device 13 for controlling internal combustion engine 14, clutch 15, and transmission 16. Acting also on fuel-quantity signal KMf predefined by the driver is a speed controller 17 and a speed limiter 18, provided that the vehicle is equipped with such devices. When speed controller 17 is turned on, it assumes the function of setpoint selection of the fuel quantity signal; speed limiter 18 limits this fuel quantity signal to the appropriate value at 102 when the maximum allowable, set driving speed 101 is reached. This entire fuel quantity signal, which for the most part can be controlled by the driver, is converted in a conversion stage 19 into a corresponding, first setpoint engine torque MDsoll 1 and fed back to an electronic transmission control 20, which likewise constitutes a part of electronic control device 13.

Figure 3:
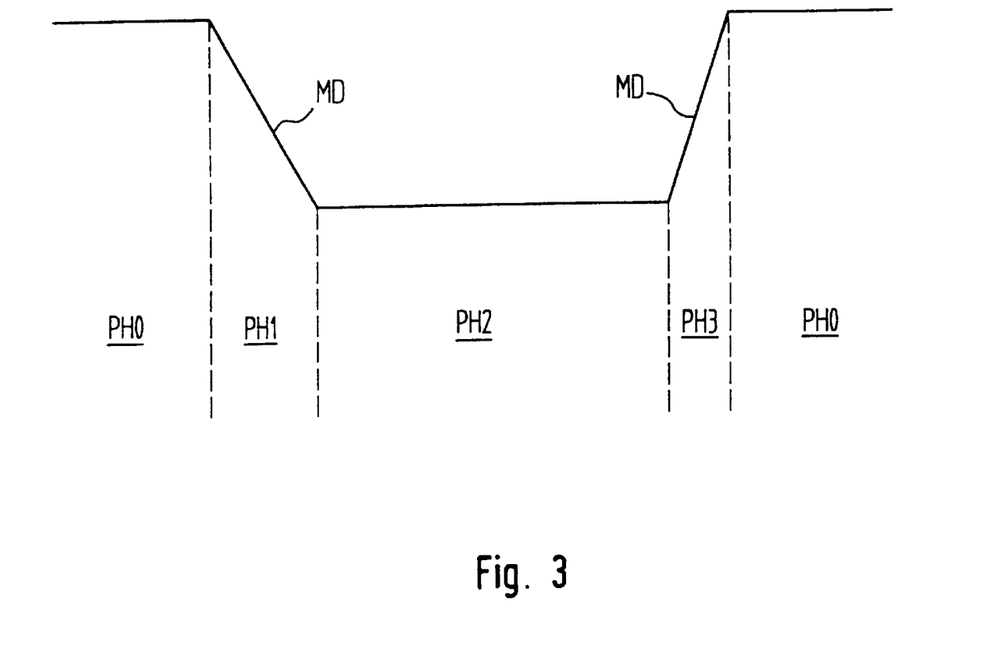
FIG. 3 shows a representation of engine torque being reduced in response to a shifting operation.

In a normal situation, i.e., when no shifting operation of the mechanical transmission 16 is taking place, fuel-quantity signal KMf preset by the driver is fed directly to engine timing 12, possibly in a form modified by speed controller 17 or speed limiter 18, through the control variable KM. This is achieved in that three series-connected changeover switches 21, 22, 23 are disposed in the switching position shown in FIG. 1. If, at this point, a shifting operation is performed, either controlled manually by the driver or automatically by transmission control 20 as a function of the momentary speed conditions, then at first, the first changeover switch 21 is shifted into its second operating position, so that, at this point, it is no longer the fuel-quantity signal predefined by the driver, but rather a fuel-quantity signal predefined by transmission control 20 that is fed to the engine timing. This corresponds to an engine torque GW-MD desired for a gear shift, as calculated in transmission control 20, this desired engine torque being converted in an appropriate setpoint selection stage 24 into a corresponding fuel-quantity signal. According to FIG. 3, in response to a gear-change operation, the engine torque is ramped down, starting from a zero phase (PH0), initially in a phase 1 (PH1). The corresponding reduction in the fuel-quantity signal is predefined by setpoint-selection stage 24. The speed is then adjusted in a phase 2 (PH2) to a value that is optimal for the particular intended gear-change operation. For this, at the end of phase 1, changeover switch 22 is actuated, so that the fuel-quantity signal is predefined at this point by a setpoint-selection stage 25, which emits a fuel-quantity signal corresponding to a desired gear-change speed GW-N and feeds it via changeover switch 22 to engine timing 12. At the end of phase 2, the torque is ramped up in a phase 3 (PH3). For this, changeover switch 22 is returned to its original position, so that setpoint-selection stage 24 is again effective via first changeover switch 21, and a signal is generated to this effect for a controlled torque increase to a new setpoint value. This is then effective again in a new zero phase following completion of the gear-change operation. At this instant, both changeover switches 21, 22 are returned to their original position, as shown in FIG. 1, so that the driver's input is again the determining input for the continued driving operation.

The automatic actuation of clutch 15 by an electronic clutch control 26, which likewise constitutes a part of electronic control device 13, occurs as well during the shifting operation. It is not described in detail here, however, since it is not the subject matter of the present invention. Reference is made however, in this regard, to the related art mentioned at the outset, as well as to German Patent No. DE-C-34 02 872, which is hereby incorporated by reference herein.

The fuel-quantity signal that is active downstream from the two changeover switches 21, 22 is fed via an additional conversion stage 27 as a further engine-torque setpoint signal MDsoll2 to transmission control 20, so that this transmission control receives the feedback information on both the engine torque input by the driver, as well as on a desired engine torque, which possibly deviates therefrom and which is influenced by the transmission control.

The fuel-quantity signal active at the output of the second changeover switch 22 then also undergoes a torque limitation provided for gear protection. For this, a torque-limiting stage 28 acts on a limiting element 29, which is arranged in a circuit parallel to the feed line to the engine timing and which can be switched to an inactive state by the third changeover switch 23. This third changeover switch 23 is usually not actuated, however, and to avoid gear overload, torque-limiting stage 28 defines a limiting value as a function of the momentary gear speed. This refers, in particular, to torques in the lower gears, reverse gears, or crawler gears. In response to a shift out of these critical gears, changeover switch 23 returns to the operating position shown in FIG. 1.

In FIG. 2, the double arrows inside electronic control device 13 characterize the mutual data transmission and data feedback. All three areas, namely engine timing 12, clutch control 26, and transmission control 20 access a shared program and data memory 30. The double arrows between electronic control device 13, on the one hand, and internal combustion engine 14, automated clutch 15, and automated, manual transmission 16, on the other hand, characterize the transmission of the control commands in question, for example for fuel metering and servo elements for actuating the clutch and gears, as well as sensor signals, speed, torque, temperature, setting of the servo elements, angular position of the gas pedal, and the like.

A shifting operation is elucidated in FIGS. 4a through 4d, which represent four portions of a single flow chart. This flow chart is subdivided into three areas, the left area referring to the engine timing, the right area to transmission control, and the middle area to global data exchanged among the areas. Thus, the present invention relates de facto to an interface between the transmission control and engine timing.

Figure 4A:
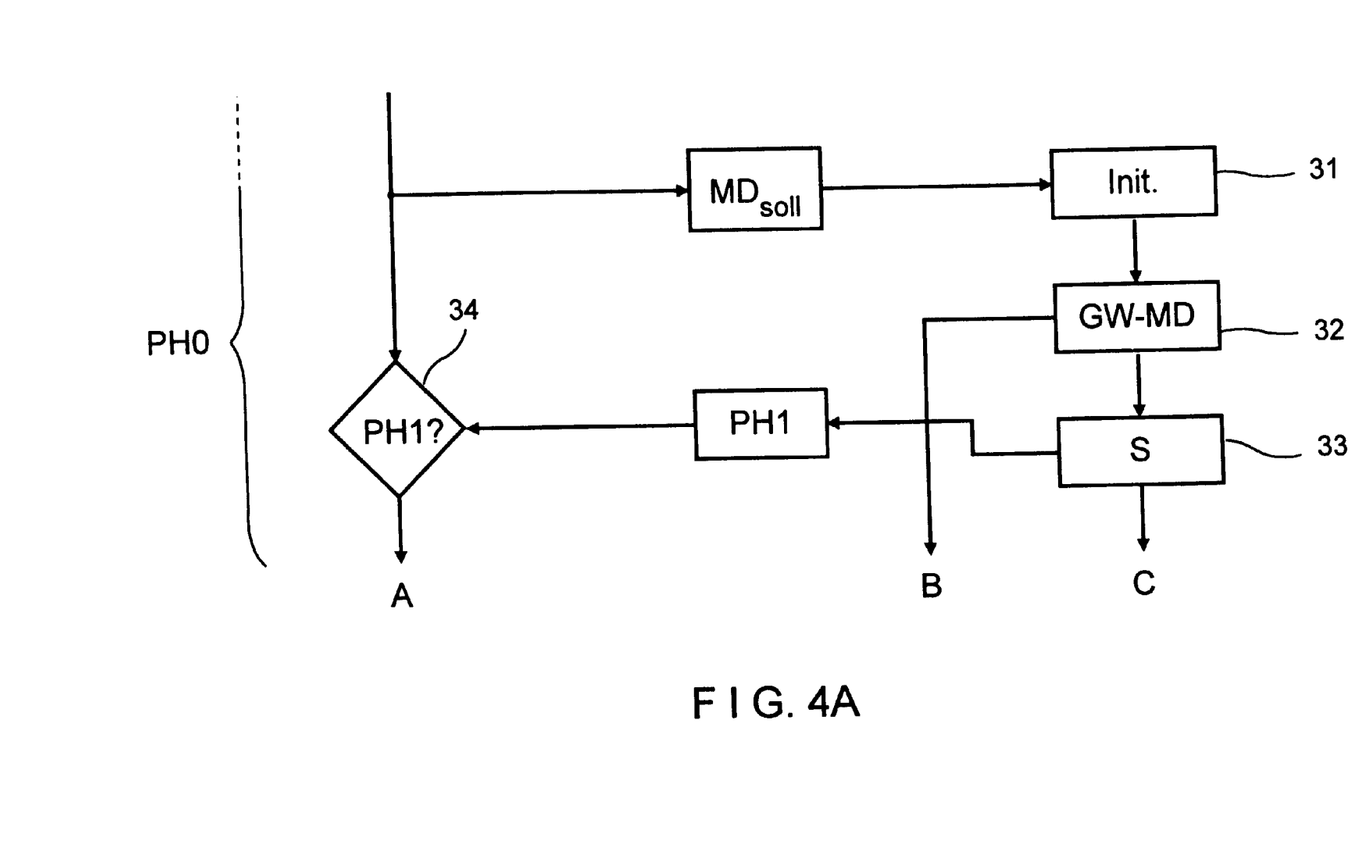
FIG. 4a through 4d show a detailed flow chart as an exemplary embodiment for elucidating the method of the present invention.

Referring to the first portion of the flow chart, FIG. 4a, initially, the transmission is in the zero phase, and setpoint engine torque MDsoll is continually communicated to the transmission control via conversion stages 19, 27. When a shift command is recognized, the downward ramp for reducing engine torque is initialized in an initialization phase 31, and the desired gear-change engine torque is calculated in a step 32 and fed (see block 106, FIG. 4b) to the engine timing, where it is initially not yet effective. A shift-request stage 33 communicates (see block 105) to the engine side whether an automatic gear intervention must be initiated (see block 103). In each of these cases, a status message for introducing phase 1 (PH1) for the shift operation is communicated to the engine timing, whereupon a corresponding wait loop 34 leads up to phase 1.

Figure 4B:
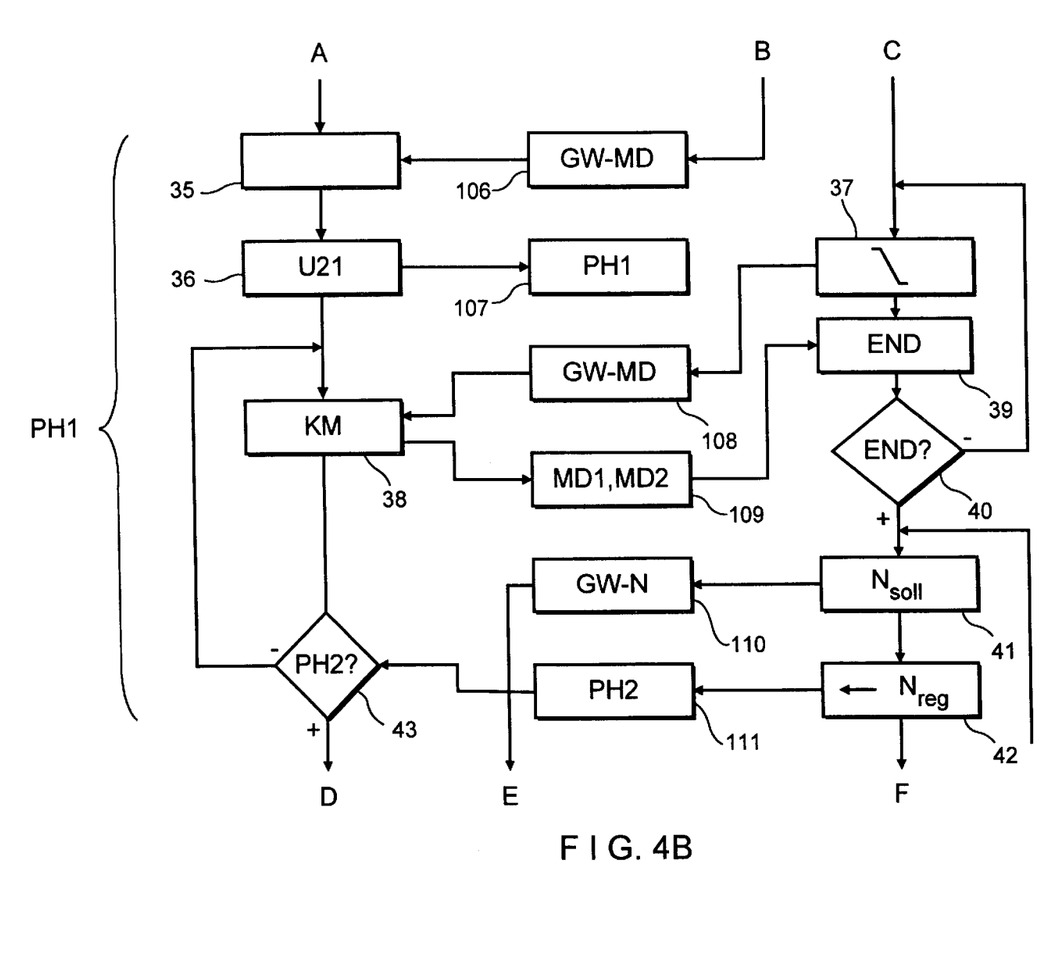

Referring to the second portion of the flow chart, FIG. 4b, in the engine timing, the suitable path is initially calculated in step 35 on the basis of the desired gear-change torque; in step 36, changeover switch 21 is then actuated and the switch-over is acknowledged in that an appropriate status message is delivered (see block 107) for the switch-over to phase 1. In the transmission control, the output for the ramp that reduces torque is initiated in the meantime in step 37 by shift-request stage 33. The desired gear-change engine torque that corresponds to the ramp function is fed (see block 108) to the engine timing, and an appropriate fuel quantity is output there passively, and the actual torque is made available. In the process, the idle-speed controller sets the lower limit for the speed. Correspondingly, the total torque of the engine (MD1) and the actual transmission torque (MD2) are communicated (see block 109) to the transmission control. From these values of the ramp function predefined in step 37, the end condition for the ramp is calculated in step 39, a wait loop 40 monitoring when the ramp end is reached.

When the ramp end is reached, the setpoint speed that is optimal for the momentary shift operation is calculated in step 41 by the transmission control and communicated (see block 110) to the engine timing as a desired gear-change speed. At the same time, in step 42, a speed control request is forwarded (see block 111) to the engine timing, in that the request signal for phase 2 (PH2) is sent. The transition to phase 2 is then controlled in the engine timing via the corresponding wait loop 43.

Figure 4C:
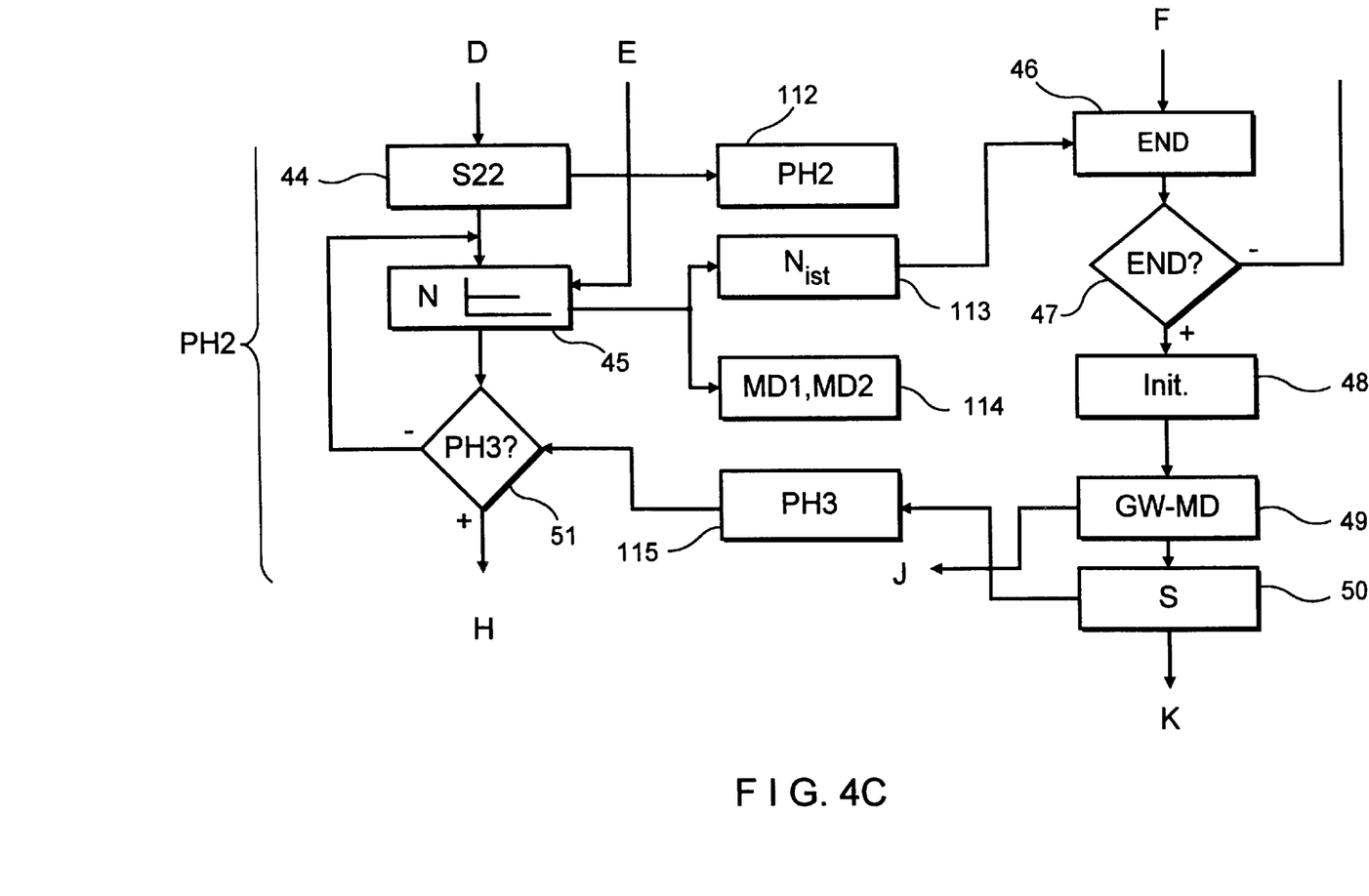
Figure 4D:
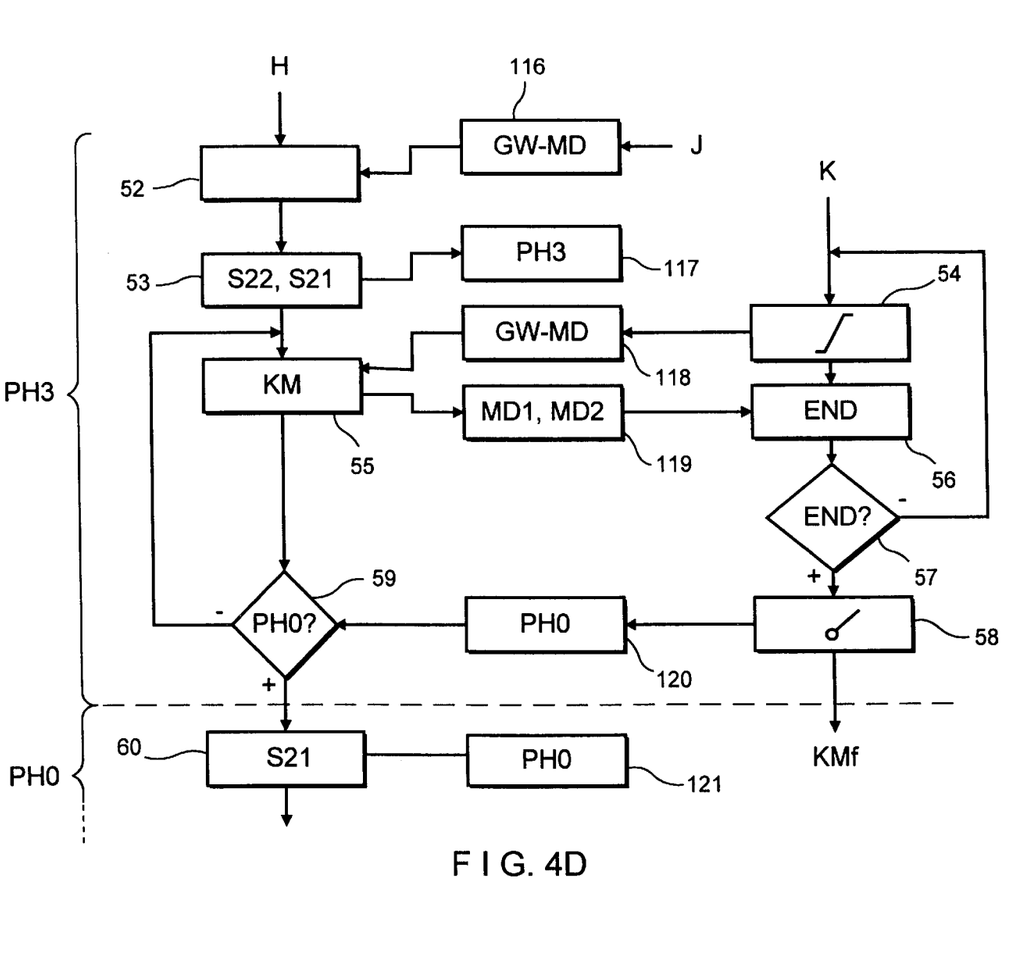

Referring to the third portion of the flow chart, FIG. 4c, in step 44, the switch is made in phase 2 to speed control, the changeover switch 22 is actuated, and the switch-over is acknowledged by status message (see block 112) 2. In step 45, the desired gear-change speed is adjusted, and the appropriate engine torque is made available. The average actual speed first is communicated (see block 113) in each case to the transmission control, where the end condition of the speed control is calculated in step 46. This end of the speed control, which signifies at the same time the end of phase 2, is monitored in wait loop 47. If the end is reached, the ramping up of the torque in phase 3 is initiated in step 48. For this, the limited torque input by the driver and the actual torque are communicated (see block 114) to the transmission control. Following the initialization phase, the desired gear-change torque is communicated (see block 116) to the engine timing in step 49. In addition, ramp-request stage 54 requests the upwards ramp, and the initiation of phase 3 for the engine timing in response to a phase signal 50. Referring to the last portion of the flow chart, FIG. 4d, the switch to phase 3 is then made (see block 118) via a wait loop 51. The path is calculated there, in turn, in step 51, on the basis of the communicated desired gear-change torque. Switch 22 is returned again in step 53 to its original position, and switch 21 is actuated to activate setpoint-selection stage 24, provided that switch 21 is not already in this position. The changeover is confirmed by status message PH3 (see block 117). The remaining execution of phase 3 corresponds essentially to that of phase 1, the distinction being that the engine torque is ramped up again. Thus, steps 37 through 44 (and 108 through 111) of phase 1 correspond in this case to steps 54 through 60 (and 118 through 121 respectively) in phase 3. Following wait loop 57, in turn, a switchover is made to the engine torque being input by the driver, i.e., to the limited torque input by the driver. After phase signal PH0 is generated to make the transition to the zero phase again, a corresponding transition follows via wait loop 59 for actuating switch 21 in step 60, returning it to the original operating position. At the same time, status message PH0 is sent (see block 121).

Of course, changeover switches 21 through 23 must not necessarily be discrete switches or semiconductor switches, but can also be constituted as switchovers effected by software.

What is claimed is:

1. A method for performing gear shifting operations in an automated mechanical transmission coupled via an automated clutch to an internal combustion engine, a setpoint engine torque being variable in response to the gear shifting operations through an electronic control device, the setpoint engine torque including a first setpoint engine torque and a second setpoint engine torque, the first setpoint engine torque being defined by a gas pedal and/or a vehicle-speed controller or limiter, the method comprising:

continually supplying an electronic transmission control of the electronic controller with the setpoint engine torque;

switching to the second setpoint engine torque in response to a manually or automatically introduced gear shifting operation of the gear shifting operations, the second setpoint engine torque being input by the electronic transmission control, the electronic transmission control calculating the second setpoint engine torque as a function of gear-change parameters and/or gear-change characteristic maps or curves; and switching to the first setpoint engine torque after completion of the shifting operation.

2. The method as recited in claim 1 further comprising initiating sequential phase order control actions for the second setpoint engine torque by the electronic transmission control during the gear shifting operation.

3. The method as recited in claim 1 wherein the second setpoint engine torque includes a desired gear-change engine torque and/or a desired gear-change engine speed.

4. The method as recited in claim 1 wherein during the gear shifting operation, the second setpoint engine torque is reduced in a downward control phase, a speed is then controlled to a predefined value in a speed-control phase as a function of the gear-change operation, and the second setpoint engine torque is increased in an upward control phase.

5. The method as recited in claim 4 wherein the second setpoint engine torque is predefined in the downward control phase by a first setpoint value ramp and in the upward control phase by a second setpoint-value ramp.

6. The method as recited in claim 5 wherein the first setpoint-value ramp ends upon reaching the predefined value and the second setpoint-value ramp ends upon reaching a zero-phase value.

7. The method as recited in claim 4 wherein during transitions between the downward control phase, the speed-control phase and the upward control phase, switch-over operations are performed.

8. The method as recited in claim 7 wherein the switch-over operations are performed by series-connected changeover switches.

9. The method as recited in claim 8 wherein the changeover switches include hardware switches.

10. The method as recited in claim 8 wherein the changeover switches include software switches.

11. The method as recited in claim 7 further comprising supplying the electronic transmission control with the setpoint engine torque actually being used for control of the internal combustion engine.

12. The method as recited in claim 1 further comprising outputting a status message after each switch-over operation.

13. The method as recited in claim 1 wherein the setpoint engine torque is fed to the engine timing in the form of a fuel quantity to be supplied to the internal combustion engine, and further comprising deriving torque values from the fuel quantity for feedback to the electronic transmission control.

14. The method as recited in claim 1 wherein the second setpoint engine torque is limited as a function of various gear settings.

15. The method as recited in claim 1 wherein the internal combustion engine is a diesel engine.

* * * * *